United States Patent [19]

Kindersley

[11] 4,187,043

[45] Feb. 5, 1980

[54] METHOD AND APPARATUS FOR BOOSTING PRESSURE IN A COAL PIPELINE

[75] Inventor: Peter G. Kindersley, Glens Falls, N.Y.

[73] Assignee: Kamyr, Inc., Glens Falls, N.Y.

[21] Appl. No.: 491,132

[22] Filed: Jul. 23, 1974

[51] Int. Cl.² .................. B65G 53/30; B65G 53/58
[52] U.S. Cl. ........................... 406/105; 406/63
[58] Field of Search ................... 302/14–16, 302/23, 66; 222/194, 367; 209/256, 258; 210/297; 406/63, 105

[56] References Cited

U.S. PATENT DOCUMENTS

| 2,672,370 | 3/1954 | Jones et al. | 302/14 |
| 2,672,371 | 3/1954 | Jones | 302/14 |
| 2,901,149 | 8/1959 | Richter | 222/367 |
| 2,914,223 | 11/1959 | Richter | 222/194 |
| 3,429,773 | 2/1969 | Richter | 162/237 |
| 3,710,762 | 1/1973 | Wendel et al. | 302/23 |
| 3,982,789 | 9/1976 | Funk | 302/14 |

FOREIGN PATENT DOCUMENTS

| 174094 | 1/1961 | Sweden | 302/14 |
| 324949 | 6/1970 | Sweden | 302/14 |

*Primary Examiner*—Jeffrey V. Nase
*Attorney, Agent, or Firm*—Cushman, Darby & Cushman

[57] ABSTRACT

A method and apparatus to boost the fluid pressure of a solids-transporting liquid in a pipeline, without applying any forces directly to the solid particles. A method and apparatus are shown to remove the solids from the liquid, boost the pressure of the strained liquid, and then to re-inject the solids into the liquid at its higher pressure, all without damaging even fragile solids.

20 Claims, 5 Drawing Figures

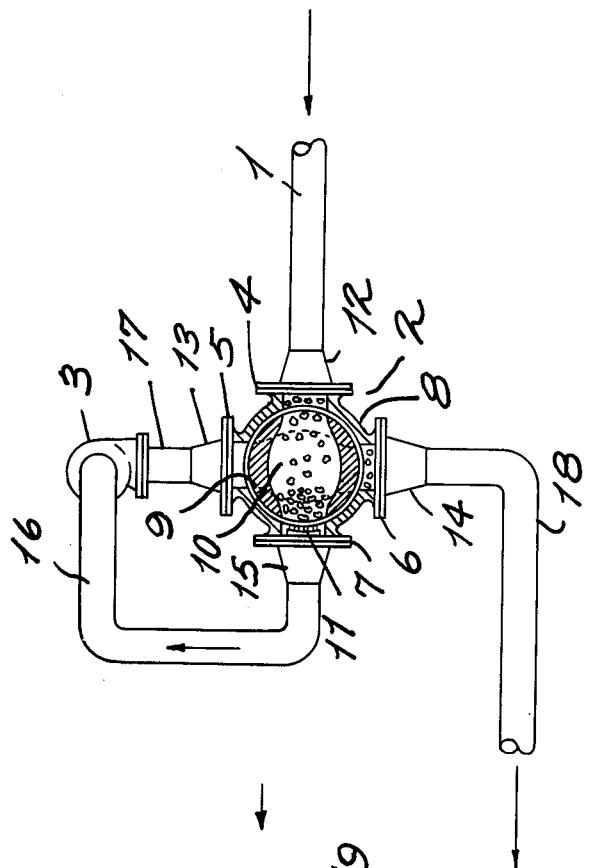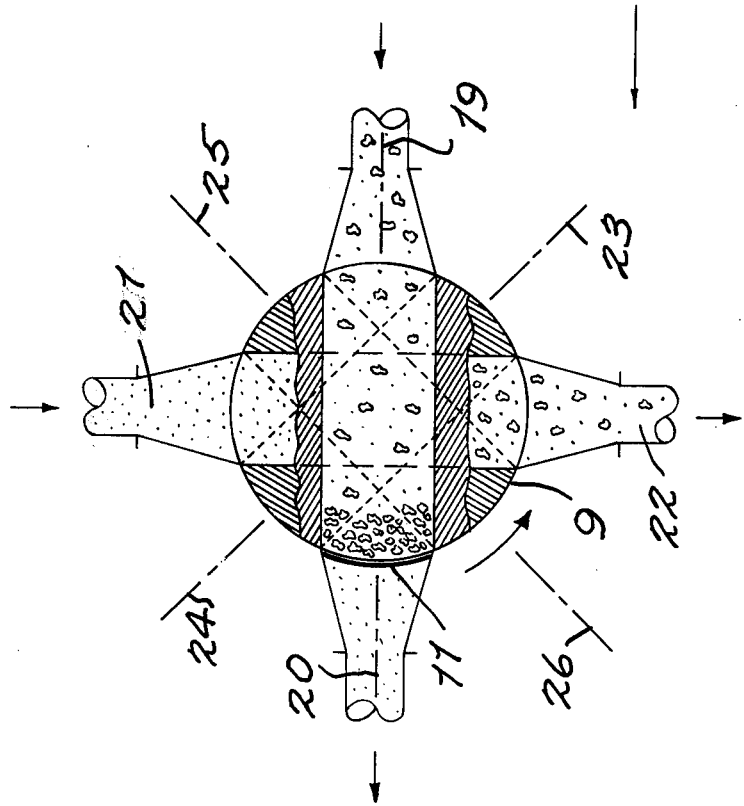

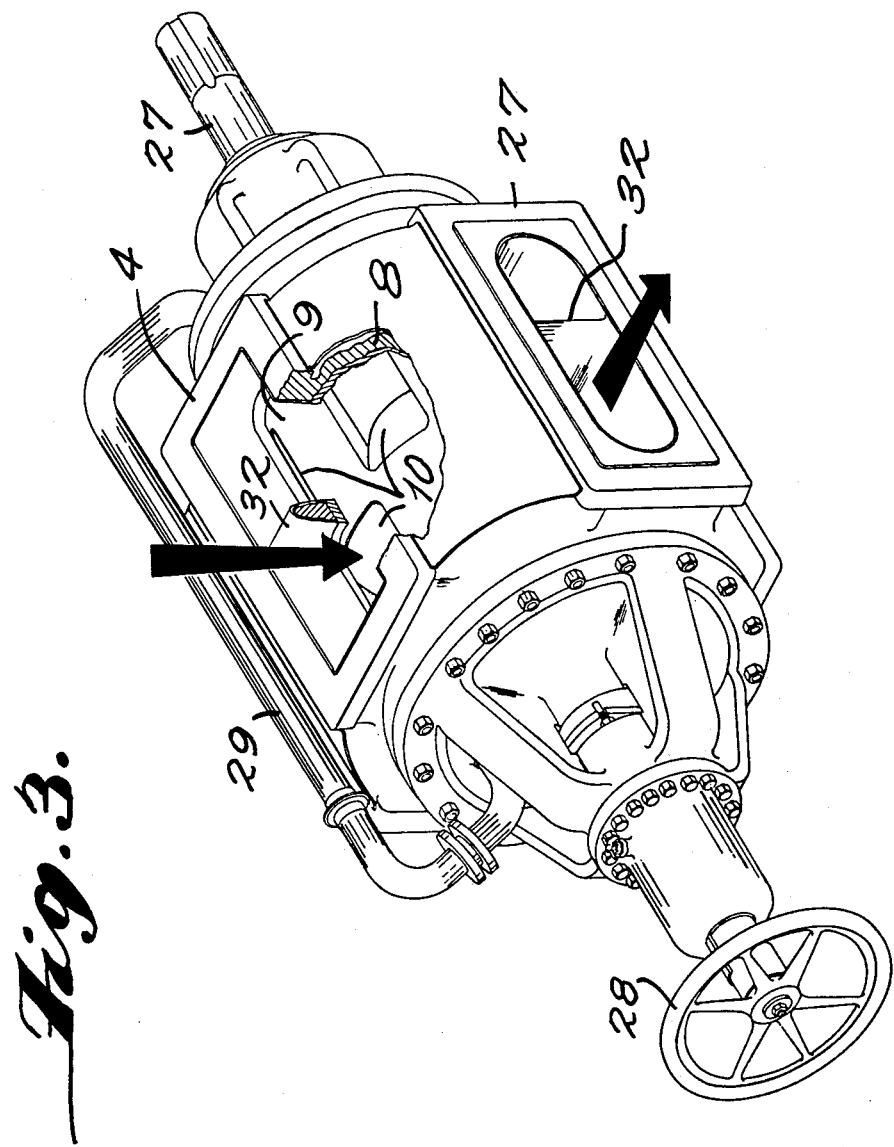

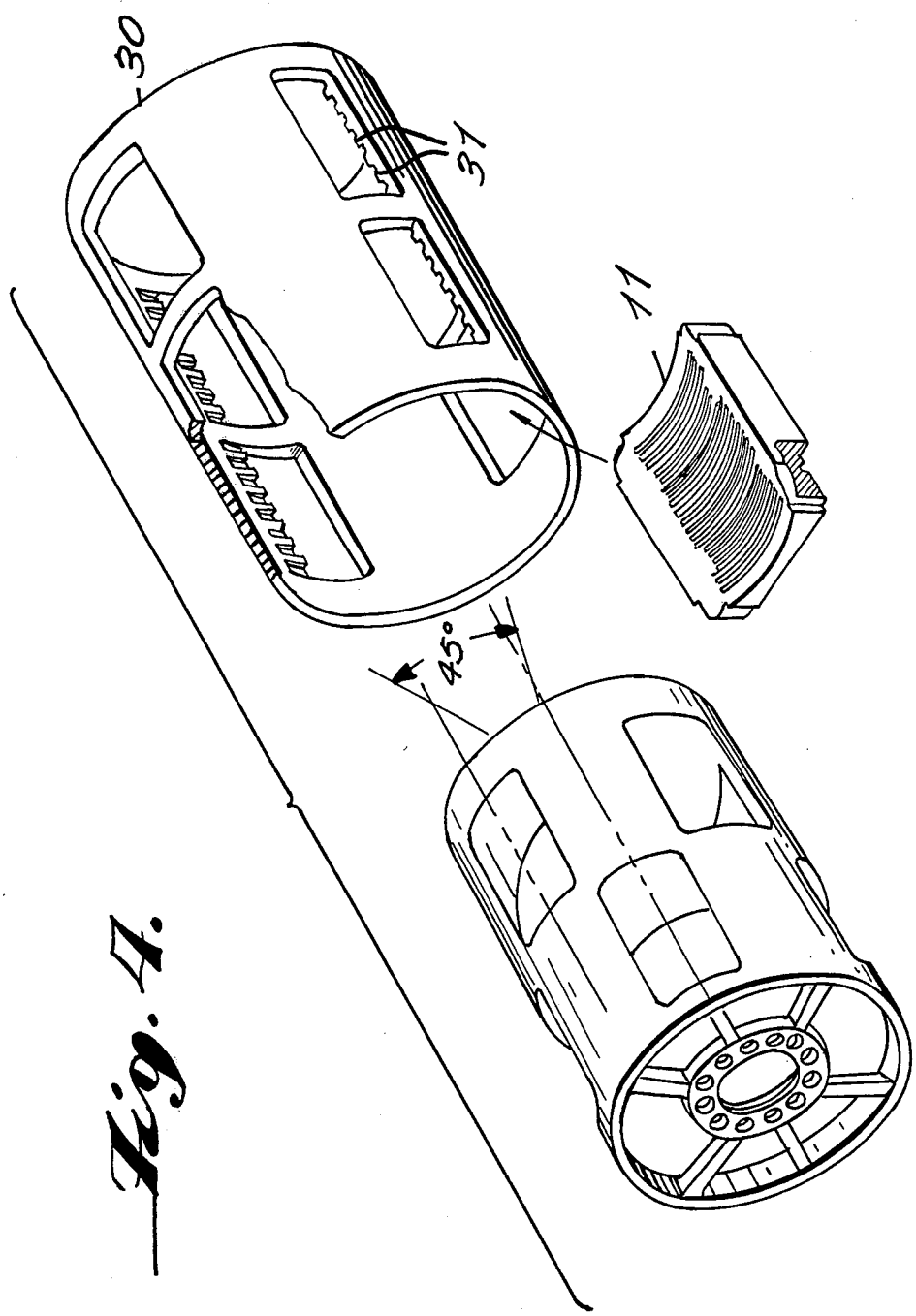

METHOD AND APPARATUS FOR BOOSTING PRESSURE IN A COAL PIPELINE

BACKGROUND AND SUMMARY OF THE INVENTION

This invention relates to a method and apparatus to allow for the boosting of pipeline pressure for pipelines conveying large particle solids such as coal in a fluid medium.

A known method of boosting pressures in pipelines with a fluid medium consists of a centrifugal pump placed in series with the pipeline. The pump receives the fluid medium from the pipeline and boosts the pressure by centrifugal force of an impeller and discharges the fluid medium at higher pressure into the continuation of the pipeline. Centrifugal pumps are well known for capability of boosting pressure of slurries with solid particles usually less than $\frac{1}{2}$ inch, entrained in a liquid. Generally, severe wear is encountered on the pump impeller and housing due to the impact of the solids on the impeller blades and housing. This impact is a result of the high velocity of the impeller needed to accomplish the pressure boosting. As the size of solid particles increases, the wear becomes more series because the larger mass of the particle creates a greater impact force. Centrifugal pumps have been lined with rubber to reduce the imapct abrasion. Although rubber lining has assisted in reducing wear, it has not wholly allowed pumps the capability of effectively pumping large solids. Technical difficulties arise with very large solids in being able to pass them through the impeller without plugging.

Other proposals for boosting pressures in pipelines carrying a fluid transporting coal or the like—such as shown in U.S. Pat. Nos. 2,672,370 and 2,672,371—are able to avoid the problem of running the particles directly through the pump, but they have the problem of requiring a separate source of supply of clear water (thus restricting the localities in which the method may be economically practiced), and require two parallel transfer pipe sections each of which are from 264 to 5280 feet long (resulting in increased expense for materials and the need for more space). The method of the present invention avoids all of these problems, while the basic apparatus for practicing it is known and proven, and the whole method is extremely simple.

According to the method of the present invention, a liquid of a given fluid pressure transporting coal or the like from a first point of low pressure is confined along a continuous flow path to a second point of higher fluid pressure, successive volumes of solids particles larger than a predetermined size are substantially continuously removed at a transfer point from communication with said flow path, the fluid pressure of the liquid flowing in the flow path downstream of the transfer point is boosted at a boosting point, and successive removed volumes of solids particles entrained with liquid are substantially continuously communicated with said liquid of boosted fluid pressure flowing along said flow path downstream of the boosting point. In this way, a continuous flow of fluid is maintained and boosted in pressure by simple means without the necessity of large and complicated structures for facilitating the boosting and without damage to boosting apparatus.

It is a principal object of this invention to provide a method and apparatus of simply removing large solids, usually greater than $\frac{1}{8}$ inch, from a continuous liquid flow prior to entry of liquid into a pump, thus allowing only liquid and small particles to be worked upon by the pump. This and other objects of the invention will become clear from an inspection of the detailed description of the invention and the appended claims.

BRIEF DESCRIPTION OF DRAWINGS

For the purpose of description the pressure booster station is shown schematically and somewhat constructionally in the accompanying drawings:

FIG. 1 is a schematic and somewhat constructional drawing of the pressure boosting station.

FIG. 2 is an illustrative embodiment of the device to accomplish the continuous large solid particle removal from the pipeline and re-injection into the pipeline.

FIG. 3 is a perspective view of the particle removal and re-injection device;

and FIG. 4 is an exploded perspective view illustrating certain parts of the device, said device being entitled "Transmission Device" in succeeding descriptions. The transmission device in FIGS. 3 and 4 shows the pipe entry in the vertical position and exit in the horizontal position. Any position may be used.

DETAILED DESCRIPTION OF DRAWINGS

Figure 5:
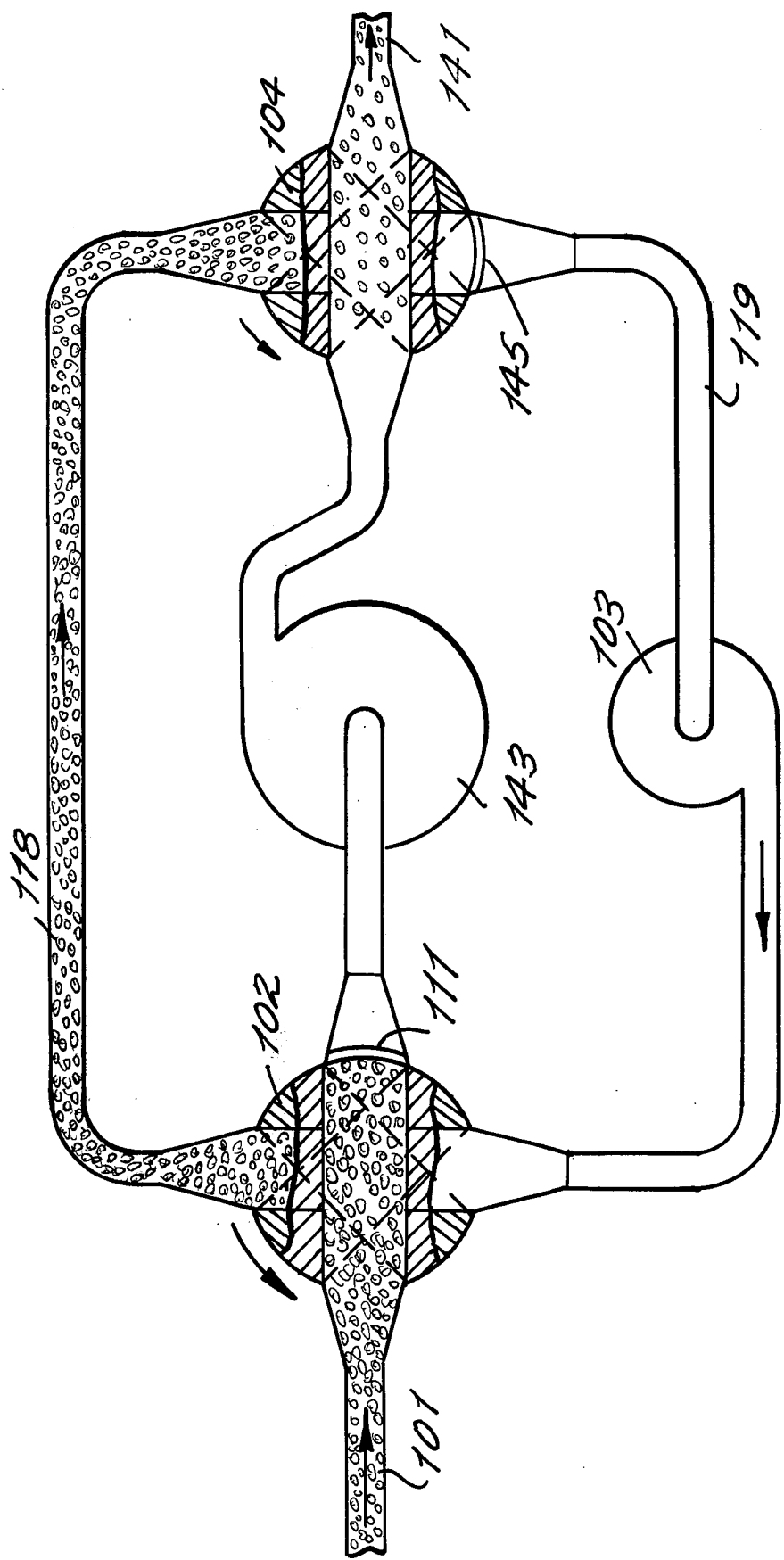
FIG. 5 is a schematical and somewhat constructional drawing of a process for boosting pressure of pipelines in stages.

The present invention for boosting the pressure of pipelines conveying large particle solids—such as coal or the like—in a fluid medium, as shown in FIG. 1, involves the pipelines 1 and 18, transmission device 2, screened fluid pipes 16, 17 and 13, and centrifugal pump 3 for pressure boosting. The solid particles and conveying fluid moving in pipeline 1 are assumed to have sustained a sufficient pressure drop due to pipeline friction to essentially limit the continued flow. At this point in the pipeline transmission, device 2 is installed. This is a well-known device [see Swedish Patent Nos. 174,094 and 324,949], used extensively for injecting wood chips at low pressure into a pipeline at relatively high pressure, without doing any physical work on the wood chips. In this way, there is no damage to the wood chips, and horsepower required for the injection is small. It is categorically a pocket feeder, wherein the low pressure chips fill a pocket, whereupon that pocket is rotated into connection with the high pressure pipeline, whereupon they are flushed by liquid flow out of the pocket. The solid material and fluid medium, fluid medium henceforth known as liquid, enter tapered pipe section 12, said pipe section increasing in cross-sectional area in the direction of flow, where the solid and liquid velocities are reduced. The solid and liquid, at reduced velocity, enter the transmission device 2 through inlet port 4 and then flow into pocket 10 of rotor 9 encased by housing 8. The rotor 9 is continuously rotating, preferably at 5 to 10 RPM, counterclockwise in FIG. 1. The large solid particles above a predetermined size, that cannot be pumped by pump 3, are prevented from flowing through pocket 10 by screen 11, said particles smaller than said predetermined size passing through screen 11 with the liquid. The screened liquid passes through port 7; having a tapered section, reduced in cross-sectional area, to establish liquid turbulence to prevent small particle settling; and through pipe 16 to pump 3. Pump 3 boosts the pressure of the liquid and small entrained solids, and discharges them through pipe 17 and 13, inlet port 5 and into a rotor pocket 10, shown as dashed lines in FIG. 1, perpendicular to the first pocket. The function and configuration of the pockets will become more apparent during the course of this description. Upon entering this second pocket 10 the small entrained solids and liquid push and mix with large solids in this second pocket causing re-injection of large solids into pipeline 18 through port 6 and pipe 14 to continue the pipelining of large solids at an increased pressure. The second pocket contained large particles 10 by virtue of having previously been in the screening out position during the rotor 9 rotation.

The function of the rotor pockets and the configuration of rotor pockets that provides for continuous screening out and re-injection of large particle solids can be understood with reference to illustrative FIG. 2. For clarity the transmission device housing is not shown in FIG. 2. Four throughgoing pockets 10 are included in rotor 9. Two pairs of pockets are included, one pocket of a pair is perpendicular to the other pocket of the same pair. Additionally, the pockets of the remaining pair are perpendicular to each other. The transmission device 2 contains four ports 4, 5, 6 and 7, each placed 90 degrees from each other peripherally around the housing. As the rotor 9 turns the pockets come successively in communication with housing ports. Each pocket of a perpendicular pair loops over its mating pocket so as to maintain the pocket openings in line peripherally around the rotor 9, such looping over shown in FIG. 3. As a pocket loops over its mating pocket of a perpendicular pair, it becomes shallower but wider to maintain a near constant cross-sectional area to flow, said widening being shown in FIG. 1. To provide for continuous screening and reinjection of large solid particles, one pair of pockets is diametrically parallel and displaced 45 degrees from the other pair, more clearly shown in FIG. 4. FIG. 2 indicates pictorally and represents the function of the pockets. At indicator lines 19 and 20 a pocket is receiving solid particles and liquid from the pipeline. The solids enter at 19, large particles are screened by screen 11 and remain in the pocket, and the small particles and liquid flow through the screen to the booster pump. At indicator lines 21 and 22 a pocket is in position where liquid and small particles at elevated pressure are being re-entrained with the large particles to continue pipeline flow. The pocket at indicators 23 and 24 has just previously caused re-injection of large particles into the pipeline and is moving to the screening out position. The pocket at indicators 25 and 26 has just screened out large solid particles and is moving to the re-injection position. The continuousness of screening and re-injection of large solid particles is caused by the configuration pockets. Visualizing rotor 9 in FIG. 2 being rotated, say 15 degrees counterclockwise, it can be seen that two pockets at indicator lines 19 and 23 are opened to low pressure flow of entering solids and liquid. However, the sum of the two pocket openings is still of constant cross-sectional opening. Screening is being performed at the other end of these two pockets at indicator lines 20 and 24. With this same visualization, the pockets at indicator lines 22 and 26 have the same partial openings for re-injection of solids into the pipeline as well as a constant pocket opening area at indicator lines 21 and 25 for boosted pressure flow. Thus it is clearly indicated that the intermittent screening out and re-injection of large particle solids by the four pockets is summed to result is continuous screening out and re-injection of large particle solids. It must also be noted that each pocket screens out and re-injects large solid particles twice for each rotor 9 revolution.

The transmission device housing ports 4, 5, 6 and 7 are more than twice the size of two port openings as shown in FIG. 3. A liner 30 is inserted in housing 8 for the purpose of wear, said liner having openings in communication with housing ports 4, 5, 6 and 7. The liner 30 and rotor 9 are tapered, with the rotor increasing in diameter in the direction of handwheel 28, said tapering allowing the handwheel to push the rotor in the direction of the drive end 27 to reduce the gap between rotor and liner. Generally, the liner is made of the same or harder material than the rotor so that for repair, the rotor need only be resurfaced. Since the rotor does not come in intimate contact with the liner, a flow of liquid and very small solid particles will exist through the gap from the high pressure ports 5 and 6 to the low pressure ports 4 and 7. This leakage flow will result in a wiping and somewhat lubricating function of the gap.

To minimize pressure shocks when opening a port to the high pressure stream, grooves 31 may be placed in the liner at opening in communication with the high pressure ports 5 and 6. The grooves allow a small area opening before the major pocket area is brought into connection with the housing port with high pressure liquid in it, so a more gradual pressurizing is allowed.

The housing has high pressure always applied to connections 5 and 6, while there is always low pressure at connections 4 and 7. The housing design would be such that the pressure difference would be accommodated. In the case of very high pressure differences between incoming and outgoing liquid, the amount of difference can be cut in half by using two feeder devices 102 and 104 [which are substantially the same as feeder 2], one removing large particle solids and one re-injecting them. The arrangement is shown in FIG. 5. The pressure in main inlet pipe 101 and main outlet pipe 141 is twice as great as the pressure in the transfer lines 118 and 119 and the transfer pump 103 since the main line pump 143 has substantially twice the power of the pump 103. Grates 111 and 145 are provided within respective outlets for rotors 102 and 104. It will be seen from an inspection of FIG. 5 that fluid with large particles therein flowing from line 101 to rotor 102 will be strained by screen 111, the fluid passing on to the main pump 143. As the rotor 102 rotates, fluid supplied through line 119 by pump 103 under moderate pressure will force the particles screened by screen 111 into line 118, where they will flow to rotor 104 and be screened by screen 145, the liquid passing through to pump 103. The particles strained by screen 145 will then, as rotor 104 rotates, be forced by fluid from main pump 143 into main line 141. This arrangement is useful in minimizing the risk of pressure shocks, since the solids are raised to outgoing pressure in 2 stages, one half the rise at each stage. This arrangement is especially useful in the case of fragile solids where the stepped pressure rise would be more tolerable.

The transmission device can be fitted with an end bell pressure equalizing line 29 to reduce end thrust on the shaft bearings. The rotor 9 of the transmission device 2 is pressure balanced perpendicular to its longitudinal axis reducing side thrust on the shaft bearings. The pressure balance is a result of the pressure at opposing ports 4 and 7 being nearly equal and the pressure at opposing ports 5 and 6 being nearly equal, and areas being made equal. Thus, low turning torque is needed, with small power consumption.

The screen 11 consists of a heavy plate containing slots. The slots as shown in FIG. 4 have a predetermined width of opening to allow small particle and liquid flow. The width of the slot opening increases in dimension in the diametrical direction. The configuration of the slots serves the purpose of allowing flow without being plugged. The preventing of plugging is caused by the rotor pocket edge wiping the slots during the rotation. Any particle not small enough to pass through the slot will be carried away with rotor pocket. No particles can lodge in the slot because of its diametrically increasing width.

While the invention has been herein disclosed in what is presently conceived to be the most practical and preferred embodiments, the invention is not to be limited to the details disclosed, but is to be accorded the full scope of the appended claims to embrace all equivalent methods and apparatus.

What is claimed is:

1. A method of boosting the fluid pressure of a liquid transporting coal particles in a pipeline from a first point of low fluid pressure in the pipeline to a higher fluid pressure at a second point, closely adjacent said first point, in said pipeline downstream of said first point without directly acting on the coal particles being transported, said method comprising the steps of
   (a) confining an established confined continuous flow of liquid and coal particles from said first point along a continuous flow path to said second point,
   (b) substantially continuously removing from communication with said flow path at a transfer point successive volumes of coal particles larger than a predetermined size entrained in liquid from said liquid while permitting liquid with coal particles smaller than said predetermined size to flow along said flow path downstream of said transfer point,
   (c) boosting the fluid pressure of the liquid flowing in said flow path at a boosting point downstream of said transfer point, and
   (d) substantially continuously communicating said successive removed volumes of coal particles entrained in liquid with said liquid of boosted fluid pressure flowing along said flow path downstream of the boosting point.

2. A method as recited in claim 1 wherein boosting the fluid pressure of the liquid flowing in said flow path downstream of said transfer point is accomplished by continuously pumping said liquid.

3. A method as recited in claim 1 wherein successive volumes of coal particles entrained in said liquid larger than a predetermined size are removed from communication with said flow path by straining said particles.

4. A method as recited in claim 1 wherein confining of said continuous flow of liquid is accomplished by running said liquid through shaped pipe sections.

5. A method as recited in claim 1 wherein substantially continuous communicating of said successive removed volumes of coal particles entrained in liquid with said liquid of boosted fluid pressure is accomplished by directing the flow path of said liquid through said transfer point.

6. A method of boosting the fluid pressure of a liquid transporting particulate solids in a pipeline from a first point of low fluid pressure in the pipeline to a higher fluid pressure at a second point, closely adjacent said first point, in said pipeline downstream of said first point without directly acting on the particles being transported, said method comprising the steps of
   (a) confining an established confined continuous flow of liquid and solid particles from said first point along a continuous flow path to said second point,
   (b) substantially continuously removing from communication with said flow path at a transfer point successive volumes of solid particles larger than a predetermined size entrained in liquid from said liquid while permitting liquid with solid particles smaller than said predetermined size to flow along said flow path downstream of said transfer point,
   (c) boosting the fluid pressure of the liquid flowing in said flow path at a boosting point downstream of said transfer point,
   (d) substantially continuously communicating said successive removed volumes of solid particles entrained in liquid with said liquid of boosted fluid pressure flowing along said flow path downstream of the boosting point,
   (e) substantially continuously communicating said successive removed volumes of solid particles entrained in liquid with liquid flowing in a transfer flow path;
   (f) substantially continuously removing from communication with liquid flowing in said transfer flow path at a second transfer point successive volumes of solid particles entrained in said liquid larger than a predetermined size while permitting liquid with solid particles smaller than said predetermined size to flow along said transfer flow path downstream of said second transfer point; and
   (g) boosting, by an amount less than the pressure of liquid flowing in said flow path is boosted, the fluid pressure of liquid flowing in said transfer flow path at a point downstream of said second transfer point in said transfer flow path; said substantially continuous communicating of successive removed volumes of solid particles in said first flow path taking place at said second transfer point after said solid particles entrained in liquid are removed from said liquid flowing in said transfer flow path.

7. A method as recited in claim 6 wherein boosting of the fluid pressure of liquid flowing in said flow paths is accomplished by continuously pumping said liquid.

8. A method as recited in claim 6 wherein successive volumes of solid particles entrained in said liquid larger than a predetermined size are removed from communication with said flow paths by straining said particles.

9. Apparatus for boosting the fluid pressure of a liquid transporting particulate solids in a pipeline from a first point of low fluid pressure in the pipeline to a higher fluid pressure at a second point, closely adjacent said first point, in said pipeline downstream of said first point without directly acting on the particles being transported by the liquid, said apparatus comprising
   (a) means for confining an established confined continuous flow of liquid and solid particles from said first point along a continuous flow path to said second point,
   (b) means for substantially continuously removing from communication with said flow path at a transfer point successive volumes of solid particles larger than a predetermined size entrained in liquid from said liquid while permitting liquid with solid particles smaller than said predetermined size to flow along said flow path downstream of said transfer point, (c) means for boosting the fluid pressure of the liquid flowing in said flow path at a boosting point downstream of said transfer point, (d) means for substantially continuously communicating said successive removed volumes of solid particles entrained in liquid with said liquid of boosted fluid pressure flowing along said path downstream of the boosting point, (e) means for substantially continuously communicating said successive removed volumes of solid particles entrained in liquid with liquid flowing in a transfer flow path, (f) means for substantially continuously removing from communication with liquid flowing in said transfer flow path at a second transfer point successive volumes of solid particles entrained in said liquid larger than a predetermined size while permitting liquid with solid particles smaller than said predetermined size to flow along said transfer flow path downstream of said second transfer point, and (g) means for boosting, by an amount less than the pressure of liquid flowing in said flow path is boosted, the fluid pressure of liquid flowing in said transfer flow path at a point downstream of said second transfer point in said transfer fluid path, said second transfer point being the point where substantially continuous communication of successive removed volumes of solid particles in said flow path takes place.

10. Apparatus as recited in claim 9 wherein each of said means for substantially continuously removing from communication with liquid flowing in said flow paths successive volumes of solid particles entrained in said liquid larger than a predetermined size includes a rotor having two pairs of passageways therethrough, one passageway of each pair being disposed substantially perpendicular to the other passageway of said pair, and said passageways of one pair being offset substantially 45° from the passageways of the other pair, and means for continuously rotating each of said rotors.

11. Apparatus for boosting the fluid pressure of a liquid transporting particulate solids in a pipeline from a first point of low fluid pressure in the pipeline to a higher fluid pressure at a second point, closely adjacent said first point, in said pipeline downstream of said first point without directly acting on the particles being transported by the liquid, said apparatus comprising (a) means for confining an established confined continuous flow of liquid and solid particles from said first point along a continuous flow path to said second point, (b) means for substantially continuously removing from communication with said flow path at a transfer point successive volumes of solid particles larger than a predetermined size entrained in liquid from said liquid while permitting liquid with solid particles smaller than said predetermined size to flow along said flow path downstream of said transfer point, (c) means for boosting the fluid pressure of the liquid flowing in said flow path at a boosting point downstream of said transfer point, (d) means for substantially continuously communicating said successive removed volumes of solid particles entrained in liquid with said liquid of boosted fluid pressure flowing along said path downstream of the boosting point, said means for substantially continuously communicating said successive removed volumes of solid particles with said liquid of boosted fluid pressure comprising a rotor having two pairs of passageways therethrough, one passageway of each pair being disposed substantially perpendicular to the other passageway of said pair, and said passageways of one pair being offset substantially 45° from the passageways of the other pair, and means for continuously rotating said rotor.

12. Apparatus as recited in claim 11 wherein said means for removing particles larger than a predetermined size from communication with said flow path includes a strainer.

13. Apparatus as recited in claim 11 wherein said means for boosting the fluid pressure of the liquid flowing in said flow path includes a centrifugal pump.

14. Apparatus for boosting the fluid pressure of liquid transporting particulate solids in a pipeline in two stages without directly acting on said large particles, said apparatus comprising (a) first and second rotors, each of said rotors having a plurality of passages therein (b) first and second fluid inlets and outlets for each of said rotors (c) means for providing communication between said first fluid outlet of said first rotor and said first fluid inlet of said second rotor, (d) means for boosting by a predetermined amount the pressure of liquid between said first fluid outlet of said first rotor and said first fluid inlet of said second rotor, (e) means for providing communication between said second fluid outlet of said first rotor and said second fluid inlet of said second rotor, and means for providing communication between said second fluid outlet of said second rotor and second fluid inlet of said first rotor, (f) means for boosting the pressure of liquid between said second fluid outlet of said first rotor and said second fluid inlet of said second rotor and said second fluid outlet of said second rotor and said second fluid inlet of said first rotor, said means boosting said pressure by an amount less than said predetermined amount said first-mentioned pressure boosting means boosts pressure, (g) means for rotating said rotors, and (h) first and second screening means for screening out particles larger than a predetermined size from said fluid, said first screening means located in said first fluid outlet of said first rotor adjacent said rotor, and said second screening means located in said second fluid outlet of said second rotor adjacent said rotor.

15. Apparatus for boosting the fluid pressure of a liquid transporting particulate solids in a pipeline without directly acting on the particles being transported by the liquid, said apparatus comprising (a) a rotor, (b) a first fluid inlet for said rotor, (c) a first fluid outlet for said rotor, (d) a second fluid inlet for said rotor substantially perpendicular to said first fluid inlet, (e) a second fluid outlet for said rotor substantially perpendicular to said first fluid outlet, (f) a pipeline connected to said first fluid inlet and said second fluid outlet for bringing said transporting liquid to said first fluid inlet and away from said second fluid outlet, (g) two pairs of passageways through said rotor, one passageway of each pair being disposed substantially perpendicular to the other passageway of said pair, and said passageways of one pair being offset substantially 45° from the passageways of the other pair, the openings of said passageways into said rotor having substantially one-half the cross-sectional area of said fluid inlets and fluid outlets, and said passageways of different pairs located adjacent one another so that a constant cross-sectional area of passageway is always presented to said fluid inlets and said fluid outlets, (h) screening means for screening particles larger than a predetermined size from said liquid while allowing passage of liquid therethrough, said screening means located adjacent said rotor in said first fluid outlet and not interfering with rotation of said rotor, (i) means for continuously rotating said rotor, (j) means for providing fluid communication between said first fluid outlet and said second fluid inlet, and (k) means for boosting the fluid pressure of liquid being conducted between said first fluid outlet and said second fluid inlet.

16. Apparatus as recited in claim 15 wherein said fluid inlets and said fluid outlets have cross-sectional areas larger than the pipeline or pipe section leading to or from said inlets and outlets.

17. Apparatus as recited in claim 15 wherein said means for providing fluid communication between said first fluid outlet and said second fluid inlet comprises a pipe section, and wherein said means for boosting the fluid pressure of liquid between said first fluid outlet and said second fluid inlet comprises a fluid pump, said pump disposed within said pipe section.

18. Apparatus as recited in claim 15 wherein each of said passages in said rotor comprise a passage that is wider at the portion thereof in the middle of said rotor than at the portions thereof adjacent the openings into said rotor each of said passages having a constant cross-sectional area throughout.

19. Apparatus as recited in claim 15 wherein said screening means comprises a plate having slots therein, each slot having a predetermined width at the portion thereof adjacent said rotor, said width at a portion thereof remote from said rotor being greater than said predetermined width, and wherein said rotor wipes said plate to keep said plate free of particles.

20. Apparatus as recited in claim 15 wherein said rotor is rotatable within a stationary cylinder having a liner therein, said liner having grooves therein at portions thereof communicating with said second fluid inlet and said second fluid outlet.

* * * * *